(12) United States Patent
Marcantonio

(10) Patent No.: US 10,451,194 B2
(45) Date of Patent: Oct. 22, 2019

(54) VALVE SHUTTER AND VALVE INCLUDING SAID SHUTTER

(71) Applicant: CEME S.P.A., Milan (IT)

(72) Inventor: Vincenzo Marcantonio, Carbonate (IT)

(73) Assignee: CEME S.P.A., Milan (IT)

(*) Notice: Subject to any disclaimer, the term of this patent is extended or adjusted under 35 U.S.C. 154(b) by 9 days.

(21) Appl. No.: 15/737,147

(22) PCT Filed: Jun. 22, 2016

(86) PCT No.: PCT/IB2016/053697
§ 371 (c)(1),
(2) Date: Dec. 15, 2017

(87) PCT Pub. No.: WO2016/207802
PCT Pub. Date: Dec. 29, 2016

(65) Prior Publication Data
US 2018/0180197 A1 Jun. 28, 2018

(30) Foreign Application Priority Data
Jun. 25, 2015 (IT) .................. 102015000027437

(51) Int. Cl.
F16K 47/02 (2006.01)
F16K 39/02 (2006.01)
F16K 1/36 (2006.01)
F16K 31/06 (2006.01)

(52) U.S. Cl.
CPC .............. F16K 47/023 (2013.01); F16K 1/36 (2013.01); F16K 31/0655 (2013.01); F16K 39/02 (2013.01)

(58) Field of Classification Search
None
See application file for complete search history.

(56) References Cited

U.S. PATENT DOCUMENTS 6,076,550 A * 6/2000 Hiraishi .............. F16K 31/0655
137/550
6,824,116 B1 * 11/2004 Woo .................... F16K 31/0655
251/129.04
8,576,032 B2 * 11/2013 Herbert ...................... F16K 7/16
251/129.15
2017/0248250 A1 * 8/2017 Super ...................... F23N 1/005

FOREIGN PATENT DOCUMENTS

EP 0012118 A1 6/1980

* cited by examiner

Primary Examiner — Jessica Cahill
Assistant Examiner — Daphne M Barry
(74) Attorney, Agent, or Firm — Pearne & Gordon LLP

(57) ABSTRACT

Valve shutter (1) comprising a main portion (2) made of a non-deformable material and a secondary portion (3) made of a deformable and resilient material as to be able to deform progressively in the transition between the open configuration and the closed configuration of a valve (100), and vice versa. The secondary portion (3) includes at least an inner chamber (6) enclosed between the main portion (2) and the secondary portion (3), having at least a through hole (7) suitable for putting the inner chamber (6) in fluid communication with a chamber (102) of a valve body (101) of the valve (100). The inner chamber (6) is configured to be progressively filled, at least partially, by a fluid during the transition between the closed configuration and the open configuration, and to be progressively emptied during the transition between the open configuration and the closed configuration.

7 Claims, 4 Drawing Sheets

Fig.2
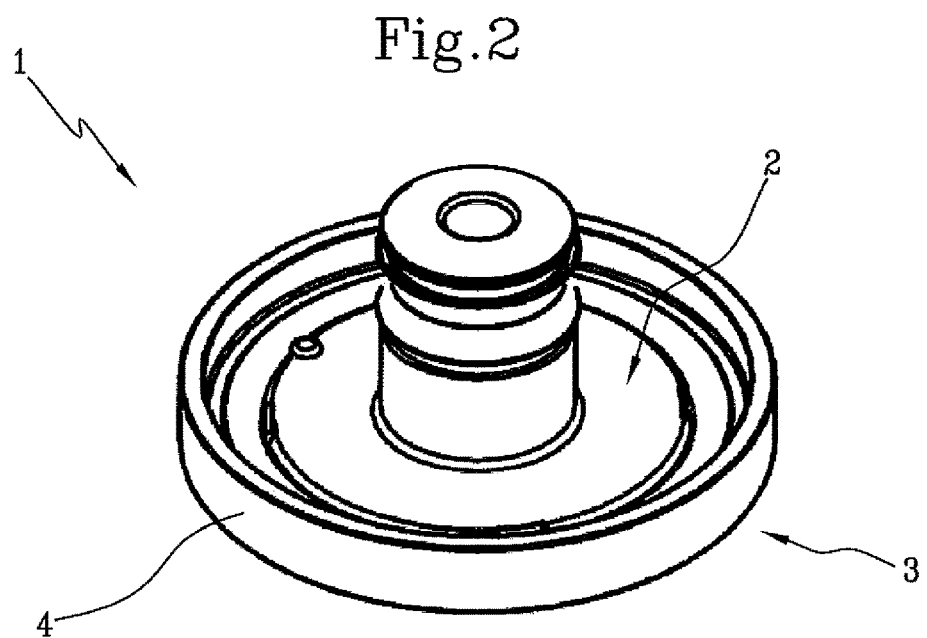
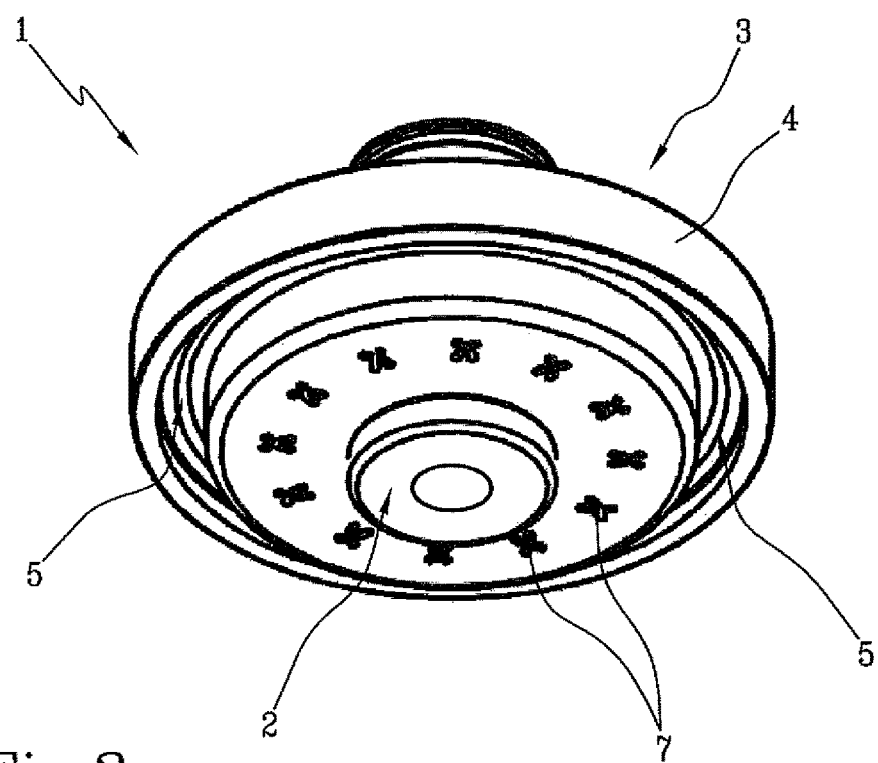
Fig.3

VALVE SHUTTER AND VALVE INCLUDING SAID SHUTTER

The object of the present invention is a valve shutter and a valve comprising said shutter.

The invention finds application in the plumbing industry.

Generally, a valve consists of a valve body defining a hole for the passage of a fluid and of a shutter to control the flow of a fluid. The shutter is movable away from and towards an actuator to open or close the passage of the fluid through the hole.

When the shutter, generally made of a monolithic prismatic with infinite stiffness, is in the closed position, it presses against the hole of the valve body (which has a smaller section compared to the shutter).

Often in the transition between the closed position and the open position, and vice versa, due to the abrupt interruption of the fluid flow, a back pressure propagating all around is generated.

The passage section becoming null immediately and with no transition is subject to the so-called "water hammer". This is a hydraulic phenomenon that occurs when a valve opens or closes abruptly a flow of fluid and consists of a pressure shockwave, whose levels of intensity may also result in the explosion of the valve or even of the conduit itself.

To overcome this drawback, it is possible to use the so-called "needle" valves, which are characterized by a frustum-conical shaped shutter inserting progressively into the through hole of the valve body to gradually vary the section of the passage creating a transition.

This type of valves, however, is difficult to realize for small applications, as they are bulky and expensive. In addition, the needle valves are associated to problems of mechanical stability due to the buckling caused by the flow of fluid.

In this context, the technical task underlying the present invention is to provide a valve shutter that overcomes one or more drawbacks of the prior art mentioned above.

In particular, the aim of the present invention is to provide a valve shutter which is structurally simple and compact at the same time, cheap to produce, and which is able to eliminate the phenomenon of water hammer. The mentioned technical task and the specified aims are substantially achieved by valve shutter, including the technical specifications set out in one or more of the appended claims.

In particular, the present invention provides a valve shutter suitable to be movable within a chamber of a valve body of a valve between a valve open configuration, in which it allows the passage of the fluid through a passage channel of the valve body, and a valve closed configuration, in which it prevents the passage of the fluid through the passage channel. The shutter includes a main portion and a secondary portion.

The main portion is made of a non-deformable material and extends along a longitudinal axis adapted for being arranged passing through a passage channel of the fluid.

The secondary portion is adapted to be interposed between the main portion and the passage channel and is made of a deformable and resilient material as to be able to deform progressively in the transition between the open configuration and the closed configuration, and vice versa, as a function of the hydrodynamic pressure of the fluid, in order to determine a gradual variation in time of the fluid passage within the passage channel.

The secondary portion includes at least an inner chamber enclosed between the main portion and the secondary portion, having at least a through hole suitable for putting the inner chamber in fluid communication with the chamber of the valve body.

The inner chamber is configured to be progressively filled, at least partially, by the fluid during the transition between the closed configuration and the open configuration, and to be progressively emptied during the transition between the open configuration and the closed configuration.

Advantageously making the shutter locally deformable in correspondence of the part of the shutter facing the passage channel, i.e. by placing a deformable secondary portion onto the main portion, it is possible to realize a transition of time before closing and after the opening of the input section of the passage channel in order to contain the pressure surges generated between the open and closed configuration. In other words, the secondary portion allows, in the transition between the open configuration and the closed configuration or vice versa, to increase the transition of time causing a gradual opening or closing of the valve.

Advantageously the secondary portion is therefore configured to dampen the back pressure waves of the water hammer.

Advantageously, the inner chamber serves as an intermediate buffer before the open or closed configuration to obtain a transitional filling/emptying, i.e. an increase/decrease in pressure, at least to gradually successive levels in the transition between the two configurations.

Preferably, the secondary portion is associated to the main portion by means of coupling means.

Preferably, the secondary portion is a resilient membrane comprising at least one peripheral rim projecting relative to a lateral surface of the main portion.

Advantageously, the resilient membrane has a superabundant edge defining the projecting peripheral rim able to bend coronally to dampen the fluid pressure.

In case of necessity of the passage channel to be occluded, when the shutter is moved along the closing stroke in the direction of the passage channel, the peripheral rim, subject to hydrodynamic pressure, waves (with wave motion similar to the sprawling movement of the jellyfish) temporarily deforming the secondary portion for letting remove a small amount of fluid prior to closing of the passage channel, thereby making the closing more gradual and preventing the occurrence of the water hammer phenomenon.

Similarly, when the shutter is pushed in the opening, the peripheral edge fluctuates allowing a gradual access of the fluid from the chamber of the valve body towards the passage channel.

Thanks to the presence of the secondary portion, the shutter may deform circumferentially to the main portion in order to determine a passage opening variable in time when opening or closing the valve.

Preferably, the second portion comprises at least one depression channel arranged so as to be opened, in a configuration of use of the shutter, towards the passage channel.

Advantageously, the depression channel contributes to the increase of the transition between the open and closed configuration, dampening the pressure inside the chamber of the valve body.

Preferably the inner chamber includes recesses, more preferably annular, and/or emerging structures in relief from the secondary portion.

Advantageously the recesses and relief structures serve as breakwater/bulkheads which create a certain resistance to the passage of the fluid by increasing the hydrodynamic resistance. The fluid enters and leaves the through holes filling/emptying the inner chamber in the transition between the open and closed configuration, or vice versa, passing through tortuous paths formed inside the recesses, thereby increasing the transition between the two open and closed configurations.

Preferably, the emerging structures and/or the recesses are arranged circumferentially and/or radially about said longitudinal axis of the shutter inside the recesses, preferably alternating with respective through holes.

Preferably, the secondary portion is disc-shaped.

Advantageously, the shutter according to the present invention allows an optimal and effective control of the flow of a fluid passing inside a valve.

According to a further aspect of the present invention it is also provided a valve, preferably a solenoid valve, even more preferably a bistable solenoid valve, comprising the shutter object of the present invention.

Advantageously the presence of a shutter comprising a secondary portion with the previously disclosed features allows to obtain an efficient and durable valve over time.

Further characteristics and advantages of the present invention will become more apparent from the description of an exemplary, but not exclusive, and therefore non-limiting preferred embodiment of a valve shutter, as illustrated in the appended figures, in which:

FIG. 2 is a schematic top perspective view of a second embodiment of a valve shutter according to the present invention.

FIG. 3 is a schematic bottom perspective view of the second embodiment of FIG. 2;

With reference to the attached figures, 1 refers to a valve shutter as a whole.

Figure 1:
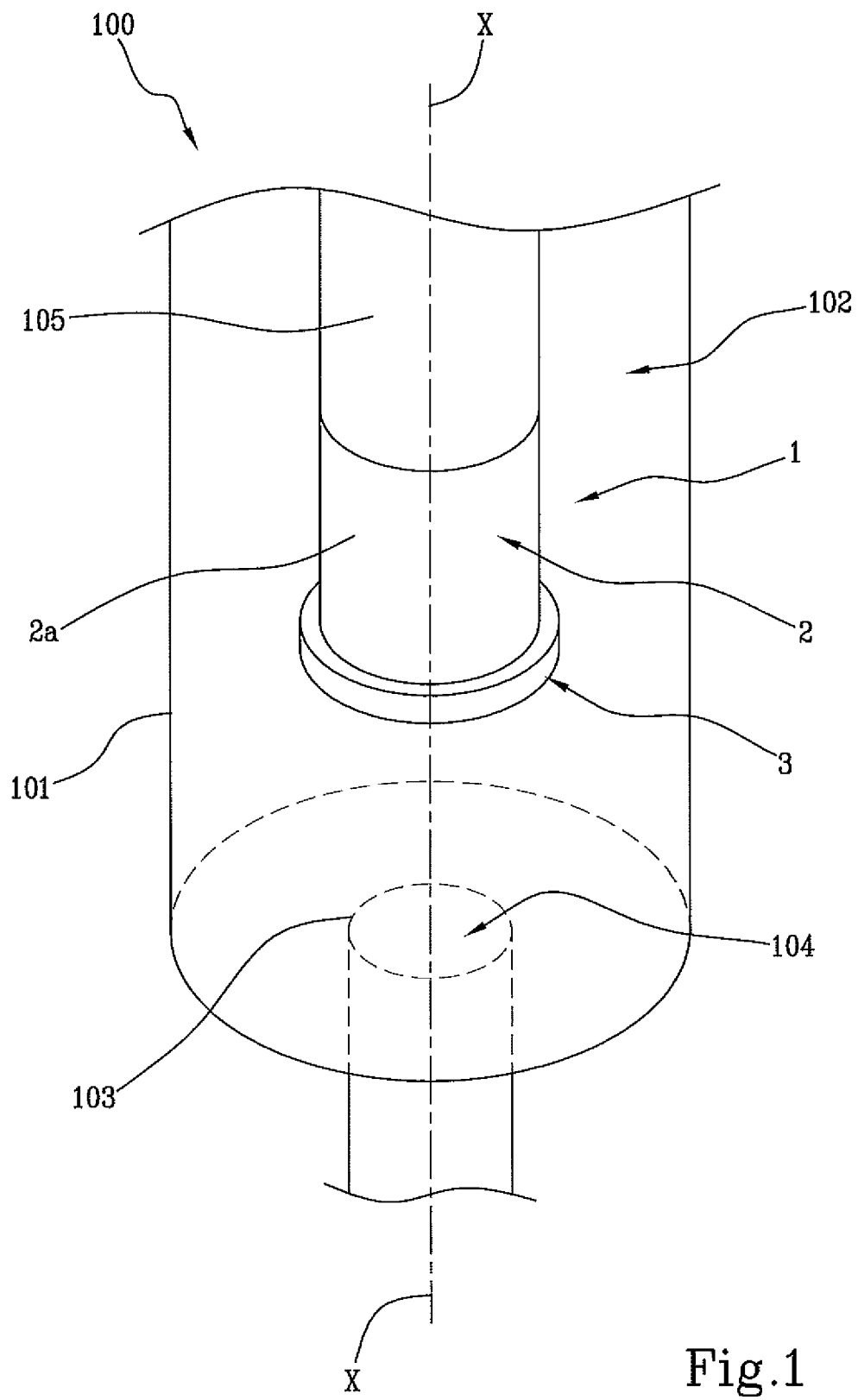
FIG. 1 is a schematic perspective view of a valve comprising a valve shutter in a first embodiment according to the present invention.

FIG. 1 schematically shows a valve 100 including a valve body 101 and a shutter 1.

The valve body 101 includes a chamber 102 having at the bottom an input section 103 of a passage channel 104 of the valve body 101.

The valve shutter 1 is suitable to be movable within a chamber 102 of the valve body 101 between a valve 100 open configuration, in which it allows the passage of the fluid through a passage channel 104, and a valve 100 closed configuration, in which it prevents the passage of the fluid through the passage channel 104.

Preferably, in the embodiment of FIG. 1, the shutter is suitable to occlude the input section 103 during the closed configuration.

In other words, therefore, the terminal part of the shutter 1 adapted to come into contact with the input section 103 has larger section compared to the size of the input section 103 itself.

In the embodiment illustrated in FIG. 1, preferably, the chamber 102 and the passage channel 104 have a cylindrical shape.

Preferably, the shutter 1 is movable by means of an actuator 105 of a known type.

The shutter 1 includes a main portion 2 and a secondary portion 3.

The main portion 2 is made of a non-deformable material and extends along a longitudinal axis "X".

The longitudinal "X" axis is adapted to be arranged passing for the passage channel 104.

Preferably, the main portion 2 is made of a metal or hard plastic material with infinite stiffness.

The secondary portion 3 is adapted to be interposed between the main portion 2 and the passage channel 104.

Advantageously, the secondary portion 3 is made of a deformable and resilient material as to be able to deform progressively in the transition between the open configuration and the closed configuration, and vice versa, as a function of the hydrodynamic pressure of the fluid, in order to determine a gradual variation in time of the opening of the passage between the shutter 1 and the passage channel 103.

Advantageously, in the passage between the open and closed configuration, the secondary portion 3 being deformable it deforms with respect to the main portion so as to define a toroidal passage section which imposes, in the opening or closing strokes of the shutter 1, a dynamically variable section of the passage, making gradual the pressure surges.

Preferably, the secondary portion 3 is made of silicone or rubber.

Preferably, the secondary portion 3 is disc-shaped.

Preferably, the secondary portion 3 is associated to the main portion 2 by means of coupling means. Preferably, as illustrated in the second embodiment shown in FIGS. 2-5, the secondary portion 3 is fitted on the main portion 2.

Preferably, the secondary portion 3 is a resilient membrane comprising at least one peripheral rim 4 projecting relative to a lateral surface 2a of the main portion 2.

The peripheral rim 4 subject to the hydrodynamic pressure is free to be deformed locally thus increasing the transition between the opening and the closure and to limit the excessive deformations of the secondary portion 3 following the hydrodynamic pressures.

The membrane with which the secondary portion 3 is made is appropriately designed and shaped to impart the correct degree of deformability to the membrane itself.

Figure 5:
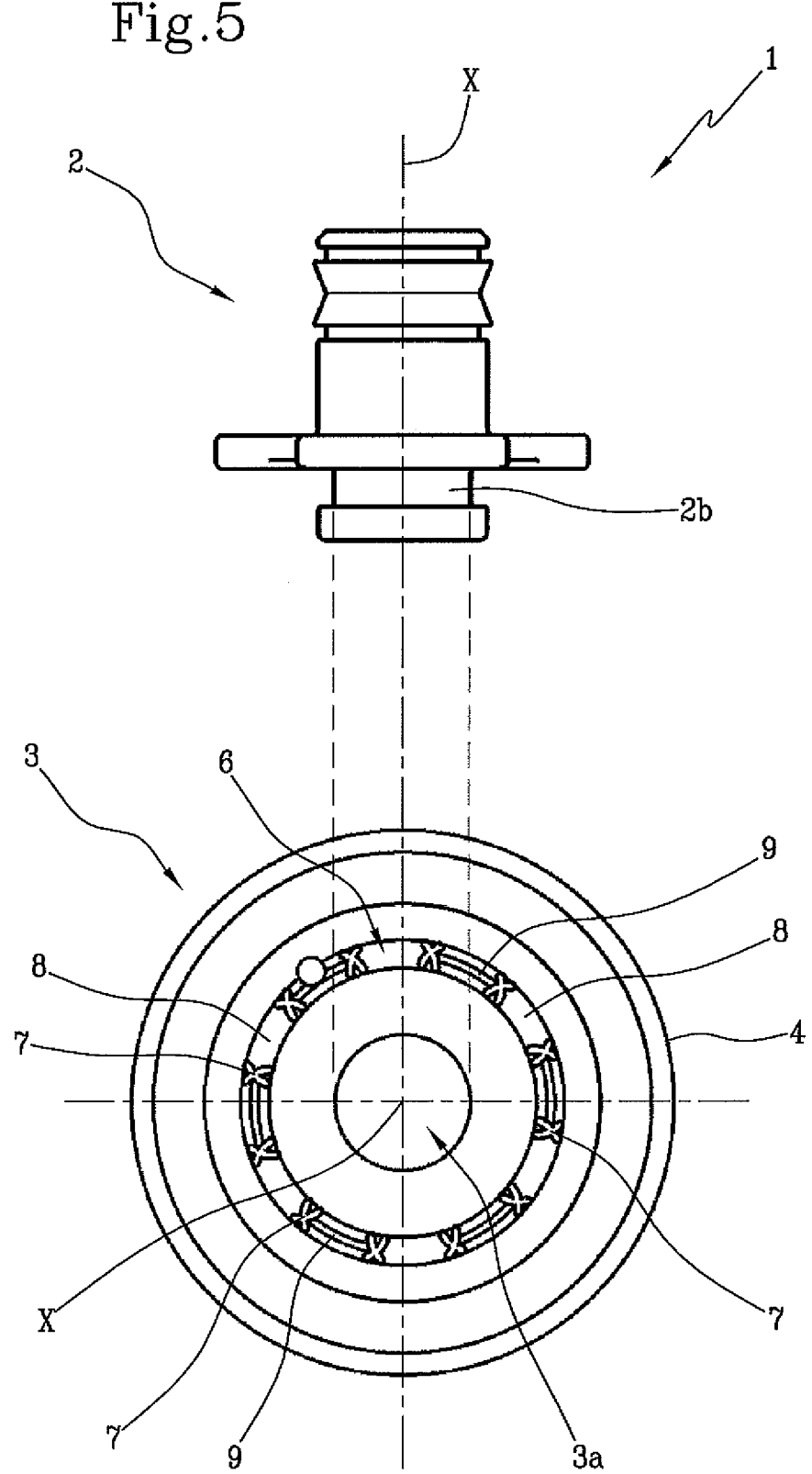
FIG. 5 is a schematic exploded view of the second embodiment of FIG. 2.

In FIG. 5 it is shown an exploded view of the shutter 1 in a second embodiment wherein, preferably, the main portion 2 has a circumferential recess 2b adapted to receive around an opening 3a formed in the secondary portion 3, in a way that the secondary portion 3 is integral with the movement of the main portion 2.

Advantageously to further facilitate a gradual transition between the open and the closed configuration, the mechanism which determines the transition can be implemented with additional stages.

With reference to FIG. 3, preferably, the shutter 1 comprises at least one depression channel 5 arranged so as to be opened, in a configuration of use of the shutter 1, towards the passage channel 104.

Advantageously, the depression channel 5 allows the peripheral edge to bend even more and to dampen effectively the back pressure waves.

The secondary portion 2 includes at least an inner chamber 6, having at least a through hole 7 suitable for putting the inner chamber 6 in fluid communication with the chamber 102 of the valve body 101.

As shown in FIGS. 2-5, preferably, the through holes 7 are X-shaped.

The inner chamber 6 is configured to be progressively filled, at least partially, by the fluid during the transition between the closed configuration and the open configuration, and to be progressively emptied during the transition between the open configuration and the closed configuration.

Figure 4:
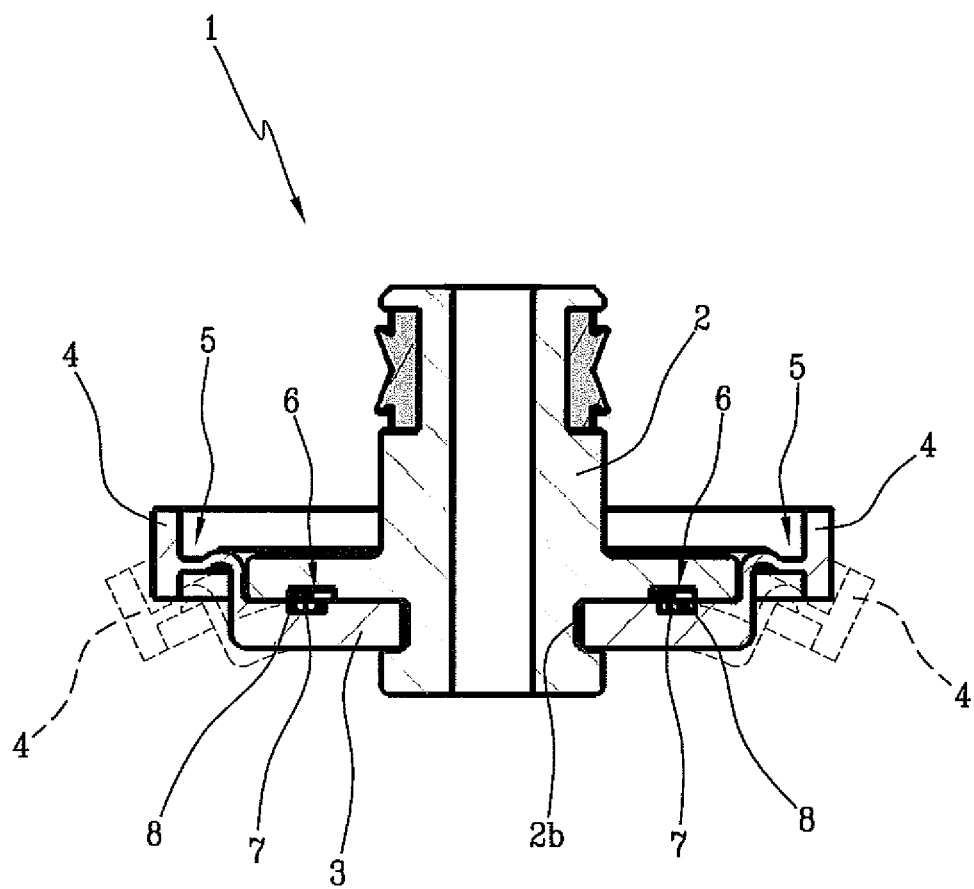
FIG. 4 is a schematic cross section of the second embodiment of FIG. 2.

As illustrated in FIG. 4, the inner chamber 6 is enclosed in use between the main portion 2 and the secondary portion 3 of the shutter 1.

When the fluid, entering from the through holes 7, fills the inner chamber 6, it tends to bend elastically the secondary portion 2, which deforms (as for example illustrated by the dashed lines of FIG. 4), pushing it away from the main portion 2.

With reference to FIG. 5, preferably the inner chamber 6 includes recesses 8, more preferably annular, and/or emerging structures 9 in relief from the secondary portion 3.

Preferably, the emerging structures 9 and/or the recesses 8 are arranged circumferentially and/or radially about said longitudinal axis "X", preferably alternating with respective through holes 7.

The arrangement and the geometry of the through holes 7, of the recesses 8, and of the emerging structures 9 is customizable according to the desired transitional time.

Furthermore, emerging structures 9 also perform a function of stiffening the structure of the whole secondary portion 3, to avoid that this is immediately crushed during the transition from the open to the closed configuration, allowing the correct emptying/filling of the inner chamber 6. The emerging structures 9 advantageously break down the swirl of the flow and at the same time prevent the recesses 8 from collapsing while the secondary portion 3 deforms during the closing strokes of the shutter 1.

According to an aspect of the present invention it is provided a valve 100, preferably solenoid valve, even more preferably bistable solenoid valve, comprising a shutter 1 previously described.

Preferably, the valve 100 can be power-assisted, i.e. it may include a pre-chamber, not shown in the attached figures, which imposes a pressure difference between the shutter 1 and the chamber 102 of the valve body 101.

The present invention achieves the proposed aims, providing the user with a simple and compact shutter 1 which can be employed in any situation in which there is the need to eliminate the possible occurrence of the water hammer phenomenon in a valve 100, overcoming the drawbacks complained in the prior art, and ensuring a very high level of effectiveness compared to a cost-effective production.

The invention claimed is:

1. Valve shutter adapted for being arranged in a valve body of a valve and extending along a longitudinal axis passing through a passage channel of the valve body, said valve shutter comprising a main portion made of a non-deformable material and being adapted to be movable within a chamber of said valve body between an open configuration of said valve, where it allows the passage of a fluid through said passage channel, and a closed configuration of said valve, where it prevents the passage of fluid through said passage channel; said valve shutter including a secondary portion adapted to be interposed between said main portion and said passage channel, said secondary portion being made of a deformable and resilient material as to be able to deform progressively in the transition between the open configuration and the closed configuration, and vice versa, as a function of the hydrodynamic pressure of the fluid, defining a gradual variation in time of the fluid passage within the passage channel; said secondary portion including at least an inner chamber enclosed between the main portion and the secondary portion, said inner chamber having at least one or more through holes suitable for putting said inner chamber in fluid communication with the chamber of the valve body, said inner chamber being configured to be progressively filled, at least partially, by said fluid during the transition between the closed configuration and the open configuration, and to be progressively emptied during the transition between the open configuration and the closed configuration; characterized in that said inner chamber comprises recesses and/or emerging structures in relief from said secondary portion, said emerging structures and/or said recesses are arranged circumferentially and/or radially about said longitudinal axis alternating with respective said one or more through holes.

2. The shutter according to claim 1, wherein said secondary portion is associated with said main portion by means of coupling means.

3. The shutter according to claim 1, wherein said secondary portion is a resilient membrane comprising at least one peripheral rim projecting relative to a lateral surface of said main portion.

4. The shutter according to claim 1, wherein the secondary portion comprises at least one depression channel arranged so as to be opened, in a configuration of use of the shutter, towards the passage channel.

5. The shutter according to claim 1, wherein said secondary portion is disc-shaped.

6. A valve, being a solenoid valve, comprising a shutter according to claim 1.

7. A valve being a bistable solenoid valve, comprising a shutter, according to claim 1.

* * * * *